US011909453B2

(12) United States Patent
Javaudin et al.

(10) Patent No.: US 11,909,453 B2
(45) Date of Patent: Feb. 20, 2024

(54) ACQUISITION OF A TEMPORARY RIGHT VIA TRANSMISSION OF A NEAR-FIELD RADIO WAVE (71) Applicant: Orange, Paris (FR)

(72) Inventors: Jean-Philippe Javaudin, Chatillon (FR); Philippe Dussaume, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/219,463

(22) Filed: Mar. 31, 2021

(65) Prior Publication Data
US 2021/0314070 A1    Oct. 7, 2021

(30) Foreign Application Priority Data

Apr. 1, 2020    (FR) ..................................... 2003241

(51) Int. Cl.
*H04B 13/00* (2006.01)
*G06F 3/01* (2006.01)
*G06F 21/31* (2013.01)
*H04B 5/00* (2006.01)

(52) U.S. Cl.
CPC .......... *H04B 13/005* (2013.01); *G06F 3/017* (2013.01); *G06F 21/31* (2013.01); *H04B 5/0031* (2013.01); *H04B 5/0056* (2013.01); *G06F 2221/2141* (2013.01)

(58) Field of Classification Search
CPC .. H04B 13/005; H04B 5/0031; H04B 5/0056; G06F 3/017; G06F 21/31; G06F 2221/2141

USPC ........................................................ 455/41.1
See application file for complete search history.

(56) References Cited

U.S. PATENT DOCUMENTS

| 10,014,960 | B1* | 7/2018 | Porat ...................... H04W 4/023 |
| 2015/0205487 | A1* | 7/2015 | Lin ...................... G06F 3/04817 |
| | | | 715/823 |
| 2020/0302428 | A1* | 9/2020 | Sambhar ............ G06Q 20/4012 |

(Continued)

FOREIGN PATENT DOCUMENTS

| WO | WO 2016/001506 A1 | 1/2016 |
| WO | WO 2018/109330 A1 | 6/2018 |

(Continued)

OTHER PUBLICATIONS

French Search Report and Written Opinion dated Dec. 17, 2020 for Application No. 2003241.

*Primary Examiner* — Eugene Yun
(74) *Attorney, Agent, or Firm* — Knobbe, Martens, Olson & Bear, LLP (57) ABSTRACT

The disclosed technology relates to a method for receiving a near-field radio wave, the wave being received using electromagnetic-wave conduction capacities of the body of a user who is able to make a validation gesture that modifies characteristics of the radio wave. The method includes detecting a first modification of a characteristic of the radio wave, the first modification being resultant from a start of the gesture, and detecting a second modification of a characteristic of the radio wave, the second modification being resultant from an end of the gesture, where the acquisition of a right for the user is dependent on the first modification and the second modification.

14 Claims, 5 Drawing Sheets

(56) References Cited

U.S. PATENT DOCUMENTS

2021/0055134 A1\* 2/2021 Gomme ............... H04B 5/0081
2021/0187389 A1\* 6/2021 Hansen .................. A63F 13/42

FOREIGN PATENT DOCUMENTS

WO    WO 2018/126250 A1    7/2018
WO    WO 2019/063902 A1    4/2019

\* cited by examiner

ACQUISITION OF A TEMPORARY RIGHT VIA TRANSMISSION OF A NEAR-FIELD RADIO WAVE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority to French Patent Application No. 2003241, filed Apr. 1, 2020, the disclosure of which is hereby incorporated by reference in its entirety.

BACKGROUND

Technical Field

The disclosed technology relates to short-range wireless communications for transmitting data between two devices, and in particular to transmission of data between two devices by way of the human body.

Description of the Related Art

Near-field communications, which can be referred to using the acronym NFC ("Near Field Communication"), and which can be mainly based on the standard ISO 14443 (International Standard Organization), use wireless technologies in order to allow data to be exchanged between two peripherals that are separated by a short distance, typically one smaller than ten centimeters. Communications of this type have many applications, for example in the fields of payment or transportation. The near-field receiver receives a message from the near-field sender. Such a message may correspond, in the aforementioned context, to the validation of a transaction, such as for example the exchange of a ticket (for an event, for travel, etc.); a payment; the launch of a personalized service on a computer or a television set; access to a room; etc.

In some embodiments, a system allowing such messages to be exchanged can be a system in which system the receiver is contained in a terminal borne by a user, the messages being received by the receiver during an intra-body communication via the user of the terminal. An intra-body communication uses the conductivity capacity of the human body to transmit the electromagnetic waves that carry the wireless communications. Such a technology is called intra-body communication (IBC).

Such a wireless communication system comprises a terminal borne by a user, the antenna of which either makes direct contact with the user, or is very close thereto, being for example located in an item of clothing or a bag. It furthermore comprises an NFC touchpoint comprising an emitter the antenna of which is for example integrated into a sensing area to which the user may make an approaching gesture, for example placing his hand on the antenna, swiping it or merely bringing his hand a few centimeters closer to the antenna. A signal sent by the touchpoint is modulated by means of a low-frequency modulator and transmitted through the body of the user. Specifically, the human body has conduction capacities that are suitable for conveying such electromagnetic signals provided that the emitting antenna is located in proximity (less than a few centimeters) from the body of the user.

The terminal receives the signal because of the physical contact, or at the very least the close proximity, of the user to the antenna of the touchpoint. The received signal is demodulated and optionally transmitted to an equipment suitable for performing processing operations, and in the present case for carrying out a transaction (payment, opening a door, etc.). In other embodiments, the terminal borne by the user operates in send mode and the NFC touchpoint in receive mode, or indeed both work in two-way mode.

In order to secure this type of transaction, it is suggested in document WO2016/001506 to detect and validate an approaching gesture of the user, in order to ensure that the gesture is intentional and not accidental. The combination of NFC and IBC technologies in this such implementations therefore allows the accordance of a right to be triggered by making it dependent on the detection of this validation gesture, but is not suitable for every type of right, for example when the attribution of the right must be dependent on time-domain characteristics of the gesture, or on a set of gestures executed by a plurality of users.

One of the aims of the disclosed technology is to remedy these drawbacks of other such implementations.

SUMMARY

The disclosed technology aims to improve the situation by virtue of, in one broad aspect, a method for receiving a near-field radio wave (NFC), the wave being received using electromagnetic-wave conduction capacities of the body (IBC) of a user who is able to make a validation gesture that modifies characteristics of the radio wave, the method comprising:
  detecting a first modification of a characteristic of the radio wave, the first modification being resultant from a start of said gesture,
  detecting a second modification of a characteristic of the radio wave, the second modification being resultant from an end of said gesture,
  the acquisition of a right for the user being dependent on the first modification and the second modification.

The validation gesture is for example the hand of the user momentarily being placed on the reader of an NFC touchpoint. One object of the method resides in the separation of the detection of the hand being placed on an NFC touchpoint, from the detection of the removal of the hand.

The detection of the start of the gesture may consist in a detection of an increase in the energy of the NFC signal or of its derivative above a certain threshold. Likewise, the detection of the end of the gesture may consist in a detection of a decrease in the energy of the NFC signal or of its derivative above a certain threshold.

In other implementations, it is the validation gesture in its entirety that is detected, this for example allowing a right to be granted to the benefit of the user. To rescind this right, in such other implementations, it is necessary to make recourse to an external criterion such as a predefined lifetime of the right, or to the occurrence of a particular event independent of the validation gesture made by the user. The term "right" here means any right, privilege or authorization that is inaccessible to the user except if he makes the expected validation gesture.

By virtue of the proposed method, it is possible to link the lifetime of the right directly to the duration of the validation gesture. The right is acquired if the expected validation gesture made by the user lasts for a length of time comprised between two precise moments in time.

For example, this allows the access of the user to a service or to a room to be limited solely to the period of contact between his hand and an NFC touchpoint. For example, the period of contact thus determined may correspond to the period for which an electrical lock of a door is unlocked.

In another application, it is also possible to make the acquisition of a particular right intended to be consumed subsequently dependent on the execution of the validation gesture at a predefined moment: it is necessary for the start and end of the gesture to be detected, and to verify that they indeed flank the predefined moment.

According to one aspect of the receiving method, the radio wave comprises frames, the method comprising extracting an identifier of a device that sent the near-field radio wave, from a frame.

By virtue of this aspect, the right manager is able to identify the right to be attributed depending on the device used to send the radio wave, which is an NFC touchpoint for example.

According to one aspect of the receiving method, the radio wave comprises frames, the method comprising extracting, from at least one frame, a time-variable verification code, which code is referred to as a random factor.

By virtue of this aspect, the right manager is able to verify at what moment the gesture was made by the user. The random factor is for example a code generated using a random function that is used synchronously both by the rights manager and by the sender of the radio wave. A new code may be generated periodically. If the code is in addition unique to the sender of the near-field radio wave and allows the manager to identify it, it is no longer necessary for the identifier of the sending device to be transmitted in the detection message. The code, which is not falsifiable, in addition to allowing a timestamp to be deduced, also allows the rights manager to verify that the identifier optionally present in the detection message is indeed that of the device that sent the radio wave.

The term timestamp is here to be understood to mean a value representing a moment in time. This value may be absolute, such as a universal time value, or be relative to a start point; for example, the timestamp of detection of the start of a validation gesture may have the value zero and the timestamp of detection of the end of the gesture may have a value representing the length of time passed since the start timestamp.

According to one aspect of the receiving method, it comprises sending a message relating to at least one detection, called the detection message, to a server that manages said right.

By virtue of this aspect, the conditions of acquisition of the right may be verified when the right manager is not comprised in the device implementing the proposed method, i.e. when the right that the user desires to acquire is not managed locally.

According to one aspect of the receiving method, the detection message comprises at least one element of a group comprising:
an identifier of the device that sent the near-field radio wave,
a random factor,
a datum relating to the user.

By virtue of the identifier of the sending device, the remote right manager may identify which right is being requested by the user.

By virtue of the random factor, the remote right manager may verify the identifier of the sending device and/or the timestamp of the validation gesture.

By virtue of the datum relating to the user, the remote right manager may verify whether the user is indeed entitled to receive the right that he is requesting. The datum relating to the user may simply be an identifier of the mobile terminal used by the user.

According to one aspect of the receiving method, a plurality of successive detection messages are sent up to the detection of the second modification, the first message of the series being sent as soon as the first modification is detected.

By virtue of this aspect, the rights manager may maintain the right for as long as valid detection messages, i.e. messages containing the data expected by the manager, are sent thereto. The lifetime of the acquired right is therefore a multiple of the length of time passing between each message send time.

According to one aspect of the receiving method, before a datum is extracted from a frame a message indicative of the detection of the validation gesture, called the return message, is sent to the device that sent the near-field radio wave.

By virtue of this aspect, the terminal may indicate to the touchpoint that sent the radio wave that it is ready to communicate. This increases security because it allows the touchpoint to wait for this moment before sending a frame comprising its identifier and/or its code (random factor) in frames of the radio wave. Thus, the identifier of the touchpoint and/or its code cannot be accidentally or maliciously captured by a terminal of another user without an intentional validation gesture on the part of the user.

In another broad aspect, the disclosed technology also relates to a device for receiving a near-field radio wave, the wave being received using electromagnetic-wave conduction capacities of the body of a user who is able to make a validation gesture that modifies characteristics of the radio wave, the device comprising a detection circuit, a processor and a memory that is coupled to the processor and that contains instructions that are intended to be executed by the processor in order to:
 detect a first modification of a characteristic of the radio wave, the first modification being resultant from a start of said gesture,
 detect a second modification of a characteristic of the radio wave, the second modification being resultant from an end of said gesture,
 the acquisition of a right for the user being dependent on the detections.

This device, which in all its embodiments is able to implement the receiving method that has just been described, is intended to be implemented in a user terminal, for example a mobile terminal borne by its user, for example held in his hand or located in an item of clothing or in a bag. The two moments, of detection of the first modification indicative of the start of the validation gesture, and of detection of the second modification indicative of its end, respectively, limit in time the attributed right.

In another broad aspect, the disclosed technology also relates to a system for acquiring a temporary right, comprising:
 a receiving device such as that described above,
 a sending device, able to emit a near-field radio wave, and
 a rights-managing device, able to attribute a right depending on at least one datum relating to the start and to the end of the validation gesture.

In such a system, the receiving device is for example comprised in a mobile terminal borne by its user, the sending device is for example comprised in an NFC touchpoint, and the managing device is for example comprised in a rights server. The rights manager may or may not be separate from the mobile terminal. When it is separate therefrom, it is important that it communicates therewith without excessive latency via a communication technology other than NFC, via a 3GPP cellular communication network for example.

A so-called NFC touchpoint comprises an NFC antenna for sending, and in certain cases receiving, a near-field wave, which may be composed of NFC frames. This antenna may be placed behind a solid screen, or integrated into this screen, the latter also being referred to as a touch surface. This surface may be touched or swiped by the user, with his hand for example. The NFC wave sent by the touchpoint with start characteristics passes through the body of the user and is received by the mobile terminal with end characteristics. The differences between the start and end characteristics of the wave depend on the location of the body of the user with respect to the touchpoint and with respect to the terminal, and on characteristics related to the propagation medium of the wave. The latter characteristics are intrinsic to the user, i.e. characteristics such as his physiological characteristics, the clothes that he is wearing, etc.

In one embodiment, the rights server must be able to determine at least two things: the right requested by the user, and the period for which the requested right must be accorded.

To identify the requested right, an identifier of the NFC touchpoint may suffice. This identifier may be comprised in the NFC frames sent by the touchpoint, and received by the terminal. The terminal may extract this identifier and send it to the rights server in the message referred to as the detection message. Regarding the period for which the right must be accorded, the terminal may furthermore insert, into the detection message, a timestamp of the start and a timestamp of the end of the validation gesture made by the user, and detected by the terminal.

According to one aspect of the system for acquiring a temporary right,
 the sending device comprises a means for detecting a physical contact with the user, and
 the rights-managing device is furthermore able to attribute the right depending on a datum relating to physical contact.

In another embodiment, the rights server may want to verify that the association between the terminal and the NFC touchpoint is real, and not the result of happenstance or intentionally simulated. This may for example be the case if the terminal passes by accident in proximity to the touchpoint, or if a non-legitimate user has the identifier of the touchpoint in his possession and makes it so that it is inserted into a detection message intended for the rights server, without the terminal being in proximity to the touchpoint. This is prevented if the touchpoint detects a contact between the user and itself, through the touch surface for example, and sends to the rights server a datum relating to this contact.

According to one aspect of the system for acquiring a temporary right,
 the sending device furthermore comprises a means for inserting, into the near-field radio wave, a random factor known to the rights-managing device, and
 the receiving device furthermore comprises a means for extracting said random factor, and a means for transmitting said random factor to the rights-managing device.

In another embodiment, the rights server may want to verify that the timestamp of the start and the timestamp of the end of the validation gesture are valid and have not been invented or falsified by the terminal. To this end, a value known both to the NFC touchpoint and to the rights server is generated in a sequence, with a periodicity and with a precise synchronization. This value is referred to as the random factor. Knowing a random factor, the rights server is therefore capable of determining the exact moment at which the random factor was generated—the reliability of a timestamp is a direct result of the reliability of the random factor. It is also understood that the frequency of renewal of the random factors, or, more exactly, the time interval separating two generations of random factor, determines the margin of precision of the timestamps.

If in the detection message the terminal communicates both an extracted random factor and a declared timestamp, the rights server may compare the timestamp declared by the terminal with that corresponding to the random factor, and prevent the attribution of the requested right in the absence of correspondence.

The NFC touchpoint and the rights server must possess the same random factor at the same time. This may be achieved in various ways: either the random factor is generated separately by each thereof, using an identically programmed random-factor generator, or only one thereof generates it and communicates it to the other in real time via any channel different from that formed by the near-field radio wave received by the terminal of the user.

According to one aspect of the system for acquiring a temporary right, the sending device comprises:
 a means for detecting a physical contact with the user, and
 a means for inserting, into the near-field radio wave, a random factor known to the rights-managing device, this means being activated after detection of the physical contact with the user.

Thus, the random factors cannot be accidentally or maliciously captured by a terminal of another user without an intentional validation gesture on the part of the user.

In another broad aspect, the disclosed technology also relates to a computer program comprising instructions that, when these instructions are executed by a processor, result in it implementing the steps of the method for receiving a near-field radio wave, as described above.

In another broad aspect, the disclosed technology also relates to a data medium readable by a device for receiving a near-field radio wave, and comprising instructions of a computer program such as mentioned above.

The disclosure technology furthermore improves the situation by virtue of, in another broad aspect, a device for managing a right that is attributed on the basis of a plurality of validation gestures made by at least one user, the gestures modifying a characteristic of a radio wave using near-field electromagnetic-wave conduction capacities of the body of the at least one user, the device comprising a processor and a memory coupled to the processor and containing instructions intended to be executed by the processor in order to:
 obtain a plurality of data relating to detection times of modifications of a characteristic of a near-field radio wave, said data being referred to as detection data,
 attribute the right to the at least one user on the basis of the times of the detections.

In another broad aspect, the disclosed technology also relates to a system for attributing a right, comprising:
 sending devices, each being able to emit a near-field radio wave,
 devices for receiving near-field radio waves, each being able to receive a near-field radio wave using electromagnetic-wave conduction capacities of the body of at least one user able to make at least one validation gesture that modifies characteristics of the near-field radio wave, each receiving device comprising a circuit for detecting a modification of a characteristic of the radio wave, and a right-managing device such as that described above, the detection data being delivered by the receiving devices.

By virtue of a right-attributing system according to the disclosed technology, it is possible to make the attribution of the right dependent on the degree of simultaneity or sequence of a plurality of validation gestures made by one or more users to one or more NFC touchpoints.

According to one aspect of the system for attributing a right, the validation gestures of at least two users are taken into account.

The condition of attribution of the right may be the simultaneity of two gestures, made to two NFC touchpoints by two users each bearing one mobile terminal on his person. Each NFC touchpoint comprises a sending device, and each terminal comprises a receiving device that sends to a right-managing device the data relating to the timestamps of the detections of the gestures. The right, for example initiation of an on-line session allowing access to sensitive data requiring the combined authentication of two people (an employee and his hierarchical superior for example), will be attributed if the two people both make a validation gesture to one NFC touchpoint, the NFC touchpoints possibly being in different locations, and even very far from each other. The combination of the two gestures, i.e. the way in which they are made timewise, must respect an expected combination, which for example is a simultaneity, or a sequence.

The system also allows two or more users, each with their terminal comprising a receiving device, to make their gesture to the same NFC touchpoint comprising a single sending device.

The system also applies to more complicated cases, with any number of users and any number of NFC touchpoints, and the condition of attribution may be more complex than a simple simultaneity or a simple sequence. For example, the gestures may need to be sequenced in a certain order, such an NFC touchpoint being required to follow such another.

According to one aspect of the system for attributing a right, two validation gestures of a user are taken into account.

The system is also applicable to a very particular case, with a single user, and without a mobile terminal. The user must make a gesture with each of his two hands to two NFC touchpoints that are separate but not too far apart from each other, each touchpoint comprising both a sending device and a receiving device. In this case, it is the crossed detection of the two validation gestures that triggers the attribution of the right. As in the other cases described above, the rights-managing device may be comprised in one of the two NFC touchpoints or be separate therefrom, depending on the type of right in question.

According to one aspect of the system for attributing a right, the detection circuit of a receiving device is arranged to:

detect a first modification of a characteristic of the radio wave, the first modification being resultant from a start of said gesture, detect a second modification of a characteristic of the radio wave, the second modification being resultant from an end of said gesture, wherein the right-managing device is furthermore able to attribute the right on the basis of the start and end times of the validation gestures.

In order to determine the degree of timewise distribution of the validation gestures, it is preferable for the rights-managing device to know the start and end times of each of the gestures. In the rights manager, a timestamp of a validation gesture may either be obtained directly from the detection datum, or deduced indirectly from the time of reception of the detection datum indicating the start or end of a validation gesture, or made possible via an indirect datum, such as, for example, a random factor randomly generated and communicated by the receiving device in the detection data, the mode of generation of the random factor, or the random factor in itself, also being known by the rights-managing device and allowing it to work out the timestamp of the gestures.

In another broad aspect, the disclosed technology also relates to a method for managing a right that is attributed on the basis of a plurality of validation gestures made by at least one user, the gestures modifying a characteristic of a radio wave using near-field electromagnetic-wave conduction capacities of the body of the at least one user, the method comprising:

obtaining a plurality of data relating to detection times of modifications of a characteristic of a near-field radio wave, said data being referred to as detection data, attributing the right to the at least one user on the basis of the times of the detections.

This method may be implemented by the rights-managing device described above. The detection data are for example sent by (NFC) devices for receiving near-field radio waves, such as described above.

If the condition of attribution of the right is a form of simultaneity of all the gestures, it is enough for the method to verify that none of the gestures is distant from a defined time by more than a certain threshold.

If the condition of attribution of the right is a form of sequence of all the gestures, it is enough for the method to verify that all the gestures follow one another, while optionally respecting a minimum or maximum time difference between two gestures, and optionally in a predefined order, if it is possible to distinguish between the gestures or the NFC touchpoints to which the gestures are made.

According to one aspect of the method for managing a right, the detection data comprise data relating to start and end times of the validation gestures, these times defining intervals specific to each of the gestures, and the right is attributed depending on a criterion relating to a timewise distribution of the intervals.

By virtue of the interval data of each of the validation gestures, the method may verify any type of timewise distribution whatever its complexity, simultaneity, sequence, or combination of simultaneity and sequence.

If the criterion is purely a simultaneity of the validation gestures, it is enough to verify that all the intervals have one time in common.

For more complex criteria, it is possible to measure and verify minimum delays between successive validation gestures, or in contrast periods of minimum overlap.

According to one aspect of the method for managing a right, the detection data comprise a time-variable verification code, which is referred to as the random factor, the random factor having been inserted into the near-field radio wave by a device that sent the wave.

By virtue of this aspect, it is possible to verify that the timestamp of the start and the timestamp of the end of a validation gesture are valid and have not been invented or falsified. To this end, a value known both to the NFC device that sent the radio wave and to the rights-managing device is generated in a sequence, with a periodicity and with a precise synchronization. This value is referred to as the random factor. Knowing a random factor, it is therefore possible to determine the exact moment at which the random factor was generated—the reliability of a timestamp is a direct result of the reliability of the random factor. It is also understood that the frequency of renewal of the random factors, or, more exactly, the time interval separating two generations of random factor, determines the margin of precision of the timestamps.

These random factors may suffice by way of data relating to timestamped detections of the validation gestures. If these data furthermore comprise timestamps that are explicitly declared by the wave-receiving devices, it is possible to compare the declared timestamp with that corresponding to the random factor, and to prevent the attribution of the requested right in the absence of correspondence.

The device that sent the radio wave and the rights-managing device must possess the same random factor at the same time. This may be achieved in various ways: either the random factor is generated separately by each thereof, using an identically programmed random-factor generator, or only one thereof generates it and communicates it to the other in real time via any channel different from that formed by the near-field radio wave.

According to one aspect of the method for managing a right, each random factor is specific to one NFC sending device.

Thus, it is possible for the managing device to distinguish between NFC sending devices solely on the basis of the detection data. It is therefore for example possible to verify that validation gestures have indeed been made to all the expected sending devices.

In another broad aspect, the disclosed technology also relates to a computer program comprising instructions that, when these instructions are executed by a processor, result in it implementing the steps of the managing method, as described above.

In another broad aspect, the disclosed technology also targets a data medium readable by a right-managing device, and comprising instructions of a computer program such as mentioned above.

The abovementioned programs may use any programming language, and be in the form of source code, object code, or of intermediate code between source code and object code, such as in a partially compiled form, or in any other desirable form.

The abovementioned data media may be any entity or device capable of storing the program. For example, a medium may include a storage means, such as a ROM, for example a CD-ROM or a microelectronic circuit ROM, or else a magnetic recording means.

Such a storage means may be for example a hard disk, a flash memory, etc.

Moreover, a data medium may be a transmissible medium such as an electrical or optical signal, which may be routed via an electrical or optical cable, by radio or by other means. A program according to the disclosed technology may in particular be downloaded from an Internet network.

Alternatively, a data medium may be an integrated circuit in which a program is incorporated, the circuit being designed to execute or to be used in the execution of the methods in question.

BRIEF DESCRIPTION OF THE DRAWINGS

The foregoing and other features of the present disclosure will become more fully apparent from the following description and appended claims, taken in conjunction with the accompanying drawings. The following description of certain embodiments of the disclosed technology, which embodiment is given by way of simple illustrative and non-limiting example. The appended drawings are given by way of non-limiting examples. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise.

DETAILED DESCRIPTION

Figure 1:
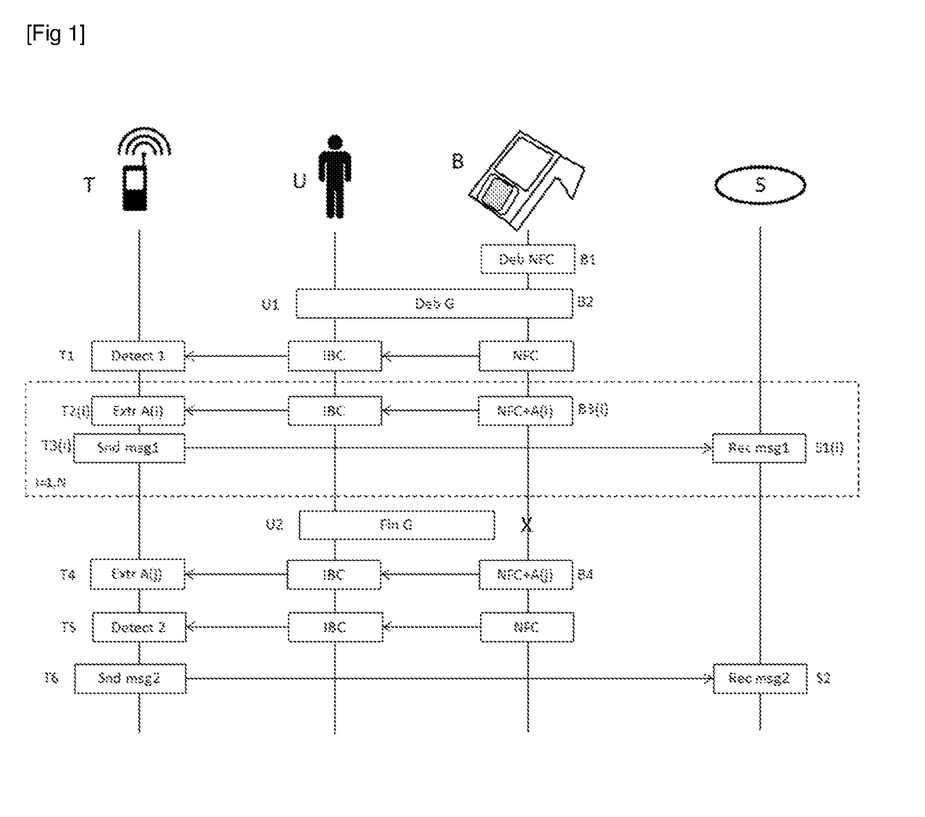
FIG. 1 shows an implementation of the method for receiving a radio wave, according to one embodiment.

FIG. 1 shows an example of an implementation of the method for receiving a radio wave, according to one embodiment of the disclosed technology.

The user U bears on his person a terminal T, for example a smartphone able to receive frames of an NFC radio wave. When the user U causes a part of his body, for example one of his hands, to approach a touchpoint B that is an emitter of NFC frames, the transmission of these frames starts to be possible between the touchpoint B and the terminal T, through the body of the user U.

In a step B1, the touchpoint B starts to emit NFC frames. This step may be triggered depending on a plurality of criteria, which will be discussed below.

In a step U1, the user U executes, with the touchpoint B, the start of a gesture referred to as the validation gesture. This validation gesture is required of him if he is to obtain, in exchange, a particular right.

In an optional step B2, the touchpoint B detects a contact with the user U, for example through a sensing area provided to this end on the touchpoint B. This detection is an example of an event that may trigger the emission of NFC frames by the touchpoint B. In this case, step B2 occurs before step B1.

It is not necessary for the touchpoint B to detect the contact. The emission of the NFC frames may indeed also be triggered by another means, for example starting from a certain time, or following an action of the user that is independent of the validation gesture, such as for example actuation of a switch on the touchpoint.

When the user starts his validation gesture, the terminal T may start to receive a radio wave carrying NFC frames, the wave being transmitted through the body (IBC) of the user U. From a certain point, in a step T1 that is described in more detail with reference to FIG. 2, the power of this radio wave becomes sufficient for the terminal T to detect the start of the validation gesture.

In a step T3($i$), the terminal T sends, to a rights manager, which may be comprised in a server S, a detection message msg1. This message may for example be transmitted through a cellular communication network, or a local Wi-Fi or Bluetooth network, by way of an SMS message, or using an Internet connection if the network is of 3rd (3G) or subsequent generation.

The message msg1 comprises at least one datum indicating to the server S that the terminal T has detected the start of a validation gesture made by the user U.

In addition, the message msg1 may comprise other data that the terminal T must extract from at least one of the received NFC frames, in a step T2($i$) prior to step T3($i$).

In this step T2($i$), which includes a demodulation of the received radio wave carrying NFC frames, the terminal T therefore receives an NFC frame sent by the touchpoint B in a step B3($i$).

In step B3($i$) the touchpoint B sends an NFC frame into which the touchpoint B has inserted various data. Among these data the following may be found:

a verification code A($i$), which is referred to as the random factor, intended for the rights manager, an identifier of the touchpoint B, if the code is absent, or insufficient to allow the touchpoint B to be identified.

The random factor A($i$) is a code known both by the touchpoint B and by the rights manager. It is used to indicate that the NFC frame that contains it was indeed sent by the touchpoint B and not by another device, or to indicate that said frame was sent at a time when this code was valid (if the code varies over time), or to indicate both of these things. Common knowledge of the code by the touchpoint and the rights manager may be achieved in a number of ways. Either the random factor is generated by one of the two thereof, then communicated in real time to the other by any means such as an Internet connection which may or may not be achieved via a cellular network, or both each possess a software module that generates the same random factors in synchronization.

Still in step T2($i$), the terminal T extracts the random factor A($i$) from the received NFC frame. In one variant, the terminal also extracts, from the NFC frame, an identifier of the touchpoint B. It may be recalled that the random factor A($i$) means nothing to the terminal B but allows it to prove that it has indeed obtained an NFC frame from a certain touchpoint at a certain time.

In step T3($i$), the terminal T therefore sends, to the rights-managing server S, the detection message msg1, into which the terminal T has inserted the random factor A($i$), in addition to the datum indicating to the server S that the terminal T has detected the start of a validation gesture.

In a step S1($i$), the server S receives the detection message msg1. By analyzing this message, using the random factor A($i$), the server S determines that a user has made to the touchpoint B the start of a validation gesture. It is at this time To that the right is "granted", i.e. that the right passes from a non-activated state to an activated state.

In a variant in which the right is personalized, the terminal T also inserts an identifier of the user U into the message msg1, this allowing the server S to determine that it is the user U, and not another user, who is requesting that the right be granted. The identifier of the user U may optionally be accompanied by a password in the message msg1, in the case where the server S must authenticate the user U, by consulting a separate authentication server, for example.

The user U may also be identified using his physio-dynamic fingerprint, i.e. his way of making the validation gesture. Specifically, the waveform of the signal received by the terminal T depends on his physiological characteristics (morphology, body mass index) and on the way in which he makes his gesture (rapidity of approach and withdrawal, stability). A trail of the gesture may be generated by the terminal and inserted into the detection message. The trail of the gesture may be compared, by the server S, with other trails of a trail database containing at least one trail originating from the legitimate user of the terminal T. Alternatively, if the terminal T is considered reliable by the system, recognition of the trail may be entrusted thereto, which then consists, for example, in comparing the trail generated by the gesture with a trail stored in memory beforehand locally by the legitimate user of the terminal. The comparison score may be inserted into msg1, or else a binary value indicating whether the score is above is of a certain threshold or not. The trail of the gesture may even be generated by the touchpoint B, via use of a passive or active radio- or light-based technology (including NFC) inter alia (ultrasound, trackpad, fingerprint, etc.), and be inserted into the NFC frame and then retransmitted via the terminal T, or into a message between the touchpoint B and the server S, in order that the latter may compare it to a known trail.

In a step U2, the user U executes, with the touchpoint B, the end of the validation gesture. When the user ends his validation gesture, from a certain point, in a step T5, which is described in more detail with reference to FIG. 2, the power of this radio wave becomes insufficient and the terminal T detects the end of the validation gesture.

The last NFC frame that the terminal T receives before or at the moment of the detection of the end of the validation gesture is sent, by the touchpoint B, in a step B4, and is received by the terminal T in a step T4.

In a step T6, the terminal T sends, to the server S, a detection message msg2. The message msg2 comprises at least one datum indicating to the server S that the terminal T has detected the end of the validation gesture made by the user U.

In addition to the datum indicating the end of the validation gesture, the terminal T inserts, into the message msg2, the random factor A(j) extracted from the NFC frame received in step T4.

In a step S2, the server S receives the detection message msg2. By analyzing this message, using the random factor A(j), the server S determines that a user has made to the touchpoint B the end of the validation gesture. It is at this time Tf that the right is "rescinded", i.e. that the right passes from an activated state to a non-activated state.

In one embodiment, the random factor is time-variable. The random factor may therefore be used by the right manager (the server S) to associate a timestamp with each of the messages msg1 and msg2 that it receives. The degree of precision of this timestamp depends on the frequency at which the random factor is generated. If for example one new random factor is generated every second, the exactness of the timestamp is at least one second.

In this embodiment, a series of N messages msg1 is sent. Steps B3($i$), T2($i$), T3($i$) and S1($i$) are repeated N times, with i=1 to N.

The time To at which the right is granted is determined in step S1(1), and the right remains valid provided that the server S keeps verifying two conditions:

the message msg1 in a step S1($i$) is not a detection message msg2 indicating that the end of the validation gesture has been detected, and the random factor A(i) received in a step S1(i) is correct.

To determine the time Tf at which the right is rescinded, the procedure followed is therefore either as above, i.e. the right is rescinded in step S2 on reception of a message msg2 by the server S, or the right is rescinded as soon as the server S detects an incorrect random factor A(i) in the series of received messages msg1, without waiting for the reception of a message msg2.

Figure 2:
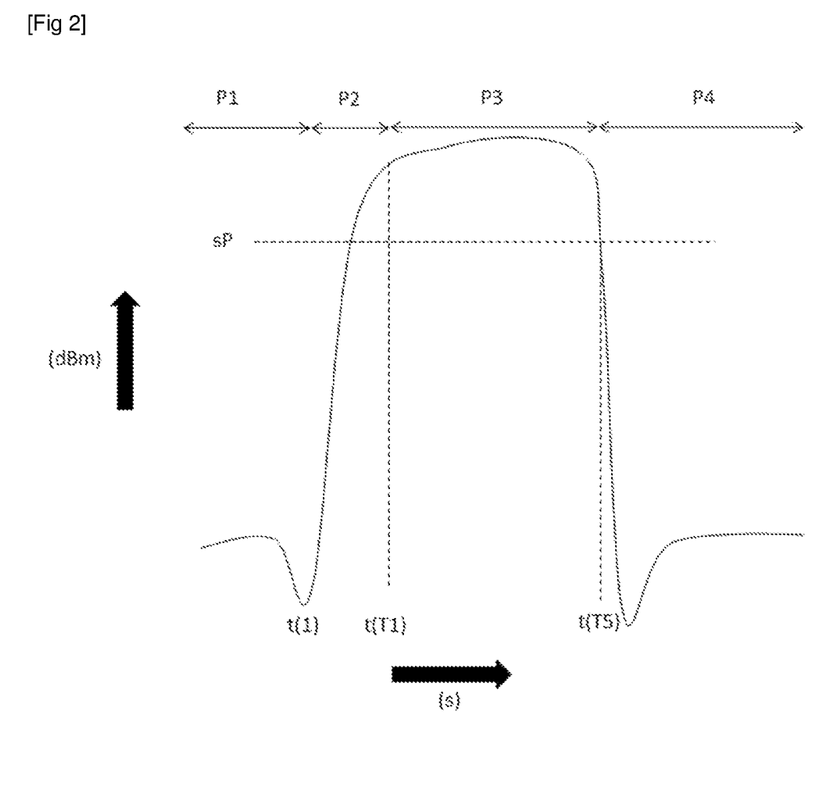
FIG. 2 shows an example of the power of a near-field radio wave corresponding to a validation gesture, according to one embodiment.

FIG. 2 shows an example of the power of a near-field radio wave corresponding to a validation gesture, according to one embodiment of the disclosed technology.

The terminal T comprises a means for analyzing the power of the wave received by virtue of the electromagnetic-wave conduction capacities of the body (IBC) of the user, when the latter makes a validation gesture to the NFC touchpoint. This gesture modifies the characteristics of the radio wave emitted by the touchpoint, and in particular the power of this wave.

The variations in power of the radio wave may be divided into 4 distinct periods. During a period P1 of inactivity, the user has not yet started his validation gesture; for example, his hand is still insufficiently near to the sensing area of the NFC touchpoint. The power of the signal is low; it is for example −70 dBm.

The period P2 of detection of a rising edge starts at a time t(1), when the power of the wave suddenly increases. The analyzing means detects the time t(1) of the start of the rising edge, for example by computing the derivative of the power and by monitoring for the point when a threshold sD is reached.

When both the derivative has dropped below the threshold sD, and the power of the wave has exceeded a power threshold sP, −50 dBm for example, this means that the rising edge has given way to a plateau. The plateau period P3 starts at this time, t(T1), which corresponds to the detection of the start of the validation gesture, i.e. to step T1 of the method which was described with reference to FIG. 1. The plateau period P3 lasts for as long as the power of the signal remains above the threshold sP.

A new period P4 of inactivity starts at a time t(T5), which corresponds to the end of the validation gesture, i.e. to step T5 of the method which was described with reference to FIG. 1, when the power once again drops below the threshold sP.

The characteristics of the wave that are used, i.e. its power and its derivative, and the use of the thresholds sP and sD, are merely one exemplary embodiment among others of the means that may be implemented in order to determine, according to the disclosed technology, the start and end of a validation gesture.

As variants, the end of the plateau is detected when the derivative of the power drops below a certain threshold and the power below another threshold. These thresholds may also be determined dynamically with respect to the power of the plateau (for example, the hand is considered to have been removed when the power drops by 10 dBm).

The times t(T1) and t(T5), which represent timestamps of the start and end of the validation gesture, may not correspond exactly to the times To and Tf, i.e. to the times at which the right is granted and rescinded by the server S, respectively. Specifically, the communication network used to transmit the messages msg1 and msg2 induces a certain latency time between the time at which they are sent by the terminal T (steps T3(1) and T6) and the time at which they are received by the server S (steps S1(1) and S2).

Alternatively, if the times t(T1) and t(T5) are inserted as timestamps into the messages msg1 and msg2 by the terminal T, the server S may use them in order to make the start and end of the validation gesture correspond exactly to the time at which the right is granted and rescinded.

In the particular embodiments that follow, the attribution of a right is dependent on a plurality of validation gestures being made by one or more users.

Figure 3:
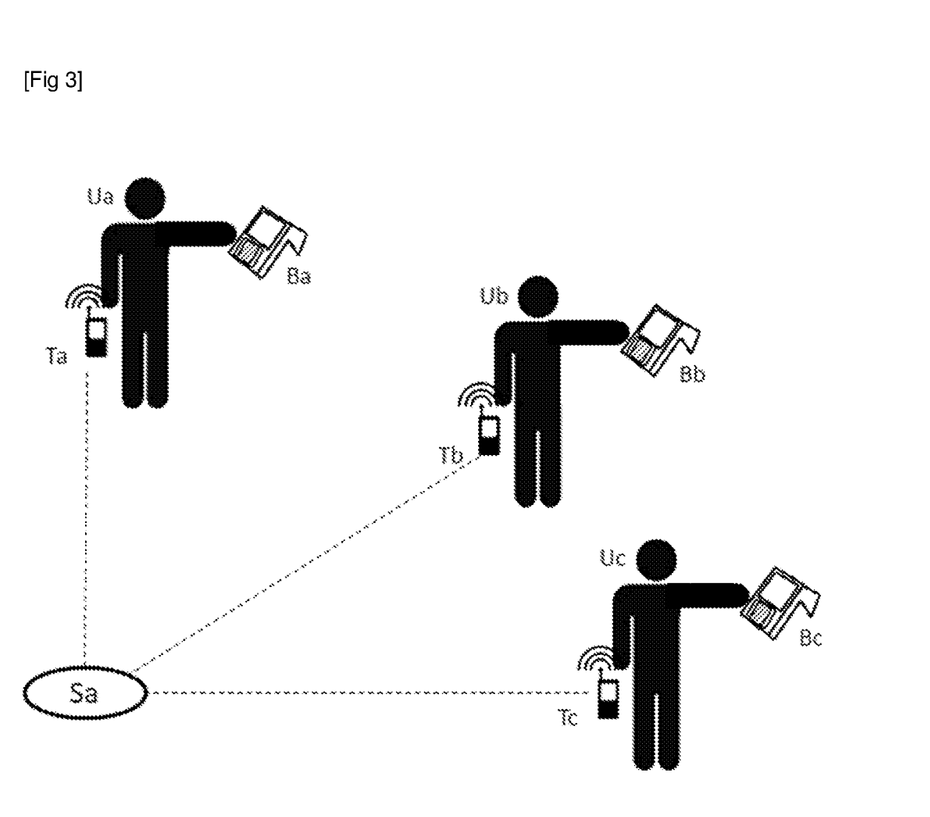
FIG. 3 shows a system for attributing a right depending on the performance of validation gestures by a plurality of users.

FIG. 3 shows a system for attributing a right depending on the performance of validation gestures by a plurality of users.

The server Sa attributes a right to all of the users Ua, Ub and Uc, provided that they each make a validation gesture to an NFC touchpoint, i.e. to the touchpoints Ba, Bb and Bc, respectively. The criteria of attribution of the right in addition include a restriction as regards the duration and the moment of each of the validation gestures. The requested right may for example be an access right to a network, to a computer application or to a service, or to an action on a software robot, or on a mechanism, such as a request to unlock a secure door.

The server Sa receives messages msg1 and msg2 from the terminals Ta, Tb and Tc borne by the users Ua, Ub and Uc, respectively, such as presented above with reference to FIG. 1 with a single user. These messages allow the server Sa to determine, for each user, a time interval IT bounded by the start and by the end of the validation gesture that he made.

With the intervals IT(Ua), IT(Ub), IT(Uc), the server Sa verifies that they meet one or more criteria such as, for example:
  each interval encompasses the same precise moment in time
  the duration of the intervals is shorter than a maximum value
  the duration of the intervals is longer than a minimum value
  the duration of the intervals is located between 2 threshold values
  the intervals follow one another in a certain order
  the intervals follow one another without overlapping
  the intervals follow one another with overlap of a minimum duration The strictness of the criteria will increase as the sensitivity and risk of fraud associated with the right to be attributed increase.

The criteria of attribution of the right may also be partially met, the server Sa for example merely verifying that a simple majority of the expected gestures have been made correctly.

Figure 4:
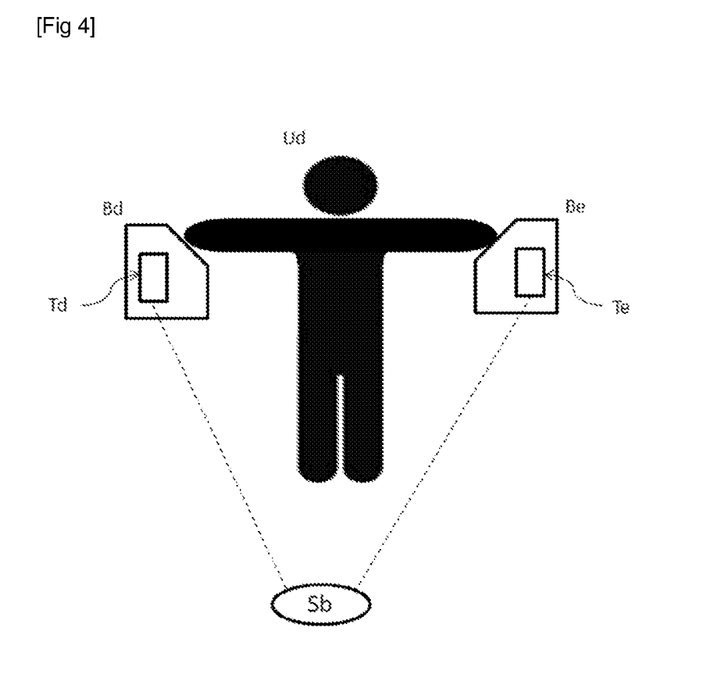
FIG. 4 shows a system for attributing a right depending on the performance of a plurality of validation gestures by a single use.

In another embodiment, the terminals Ta, Tb and Tc detect only the start of a validation gesture, or the gesture in its entirety. Only the time t of a gesture is therefore determined by the server Sa, and not the interval of its realization. In this case, the server Sa verifies that the times t(Ua), t(Ub), t(Uc) of the validation gestures meet one or more criteria such as, for example:
  each time is not distant from a precise moment in time by more than a maximum length of time
  the times follow one another in a certain order
  the times follow one another while respecting a minimum separation duration
  the times follow one another while respecting a maximum separation duration FIG. 4 shows a system for attributing a right depending on the performance of a plurality of validation gestures by a single user.

In this embodiment, a single user Ud makes, substantially simultaneously, a validation gesture with each of his hands, to two separate NFC touchpoints, Bd and Be. It is not necessary for the user to be bearing a terminal on his person, because each touchpoint also comprises a device, Td and Te, respectively, for receiving a near-field radio wave, in addition to a sending device. The touchpoints Bd and Be have the same capacities as those employed by the touchpoint B to carry out the method described with reference to FIG. 1. Likewise, the devices Td and Te have the same capacities as those employed by the terminal T to carry out the method described with reference to FIG. 1. The touchpoints are able and configured to communicate with a rights manager Sb, by a means possibly other than a near-field radio wave. The rights manager Sb possesses at least the same capacities as those employed by the server S to carry out the method described with reference to FIG. 1. The rights manager Sb may be comprised in a remote server such as the server Sa described with reference to FIG. 3, but it may also be integrated into one of the touchpoints Bd or Be, which are then connected to each other in any way, for example if the two touchpoints are contained in a single physical installation with two senders and two receivers of near-field radio waves.

In this embodiment, the proposed system may thus perform a crossed detection of the validation gestures. Combined with a physio-dynamic identification of the user by way of the trails generated via the characteristics of the radio waves modified by each of his two gestures, this system is applicable to the field of secure access via biometric authentication.

In addition, when the start and end times of each of the two gestures are transmitted to the manager Sb, the same types of time-domain criteria as those described with reference to FIG. 3 may be used to attribute the right requested by the user.

Figure 5:
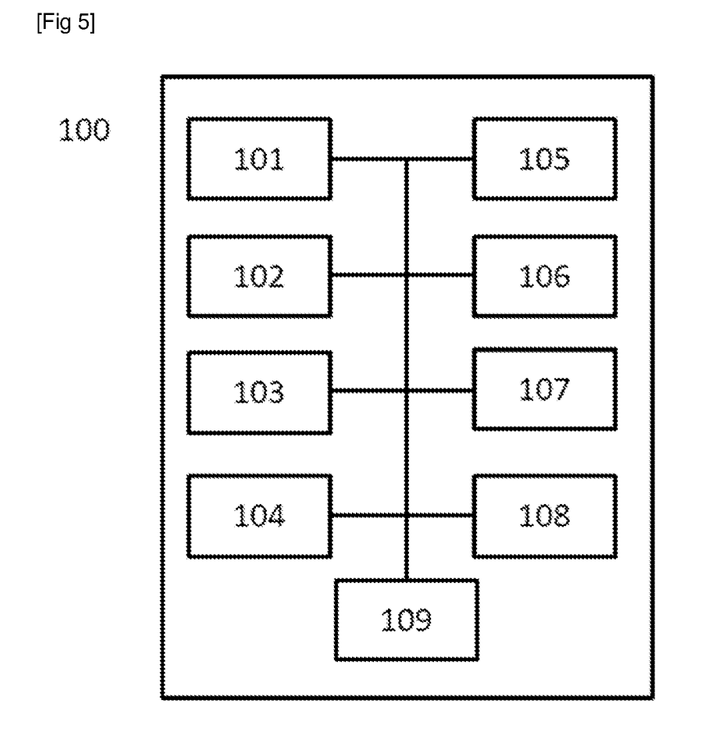
FIG. 5 shows an example of a structure of a device for receiving a near-field radio wave, according to one aspect of the disclosed technology.

With reference to FIG. 5, an example of a structure of a device for receiving a near-field radio wave, according to one aspect of the disclosed technology, will now be described.

The device 100 implements the method for receiving a near-field radio wave, various embodiments of which were described above.

For example, the device 100 comprises a processing unit 101 that is for example equipped with a microprocessor μP, and controlled by a computer program that is stored in a memory and that implements the method according to the disclosed technology. On initialization, the code instructions of the computer program are for example loaded into a volatile RAM 102, before being executed by the processor of the processing unit 101.

The device 100 furthermore comprises:
a nonvolatile ROM 103 intended to contain persistent data;
an antenna 104 suitable for sending and receiving, on the radio channel and over-the-air or via IBC;
a demodulator 105 intended to receive, via the antenna 104, a modulated electrical signal and to convert it into a digital signal intended to be transmitted to the processing unit 101; the demodulator 105 is for example used, in step T2($i$) of the receiving method described above;
a modulator 106 intended to make a digital signal produced by the processing unit 101 suitable for transmission by the antenna 104; the modulator 106 is for example used in step T3($i$) or step T6 of the receiving method described above;
a switch 107 suitable for connecting to the antenna 104 alternatively the demodulator 105 (receive mode) and the modulator 106 (send mode);
a detection circuit 108 intended to detect the start and end of a validation gesture via analysis of the radio wave, whether it is modulated or not, and especially of its power and of the derivative of its power; this circuit comprises means for detecting the radio-wave modifications that result from a validation gesture, from a start of said gesture, and from an end of said gesture; the validation circuit 108 is for example used in step T1 or step T5 of the receiving method described above; the power and the derivative may be computed from the analogue signal or completely digitally;
an optional clock 109 intended to interact with the processing unit 101, in order, inter alia, to include a timestamp in the messages msg1 or msg2.

The device 100 is stand-alone and portable; it is equipped with a battery or cell stacks of small size in order to be transported by a user. Such a device 100 may for example be implemented in a mobile terminal, or be a mobile terminal suitable for implementing a receiving method according to the disclosed technology.

Figure 6:
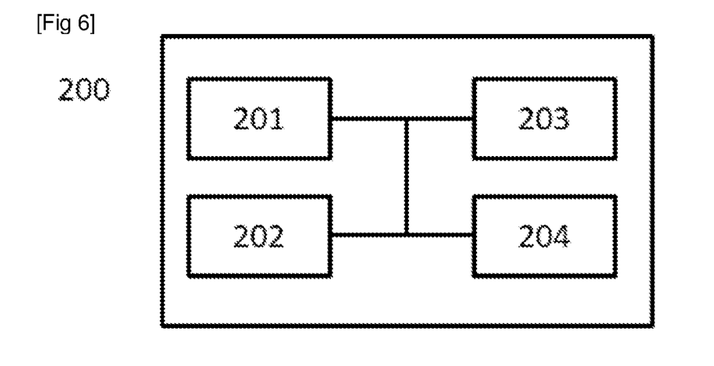
FIG. 6 shows an example of a structure of a device for managing a right that is attributed on the basis of a plurality of validation gestures made by at least one user, according to one aspect of the disclosed technology.

With reference to FIG. 6, an example of a structure of a device for managing a right that is attributed on the basis of a plurality of validation gestures made by at least one user, according to one aspect of the disclosed technology, will now be described.

The device 200 implements the method for managing rights attributed on the basis of a plurality of validation gestures made by at least one user, various embodiments of which were described above.

For example, the device 200 comprises a processing unit 201 that is for example equipped with a microprocessor μP, and controlled by a computer program that is stored in a memory and that implements the method according to the disclosed technology. On initialization, the code instructions of the computer program are for example loaded into a volatile RAM 202, before being executed by the processor of the processing unit 201, with a view to attributing a right to at least one user on the basis of the times at which a plurality of validation gestures are detected.

The device 200 furthermore comprises:
a nonvolatile ROM 203 intended to contain persistent data;
a receiver 204 configured to obtain a plurality of data relating to detection times of modifications of a characteristic of a near-field radio wave, said data being referred to as detection data.

The device 200 may be comprised in a server such as the server S, Sa or Sb, or be comprised in an NFC touchpoint such as for example the touchpoint B, or one of the touchpoints Ba, Bb, Bc, Bd, or Be.

While certain embodiments have been described, these embodiments have been presented by way of example only and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope of the disclosure.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Certain terminology may be used in the following description for the purpose of reference only, and thus is not intended to be limiting. For example, terms such as "upper", "lower", "upward", "downward", "above", "below", "top", "bottom", "left", and similar terms refer to directions in the drawings to which reference is made. Such terminology may include the words specifically mentioned above, derivatives thereof, and words of similar import. Similarly, the terms "first", "second", and other such numerical terms referring to structures neither imply a sequence or order unless clearly indicated by the context.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Although the disclosed technology has been described in the context of certain embodiments and examples, it will be understood by those skilled in the art that this disclosure extends beyond the specifically disclosed embodiments to other alternative embodiments and/or uses of the embodiments and certain modifications and equivalents thereof. The scope of the present disclosure is not intended to be limited by the specific disclosures of preferred embodiments in this section or elsewhere in this specification, and may be defined by claims as presented in this section or elsewhere in this specification or as presented in the future.

What is claimed is:

1. A method for receiving a near-field radio wave, the wave being received using electromagnetic-wave conduction capacities of the body of a user able to make a validation gesture that modifies characteristics of the radio wave, the radio wave comprising frames, the method comprising
    detecting a first modification of a characteristic of the radio wave, the first modification being resultant from a start of the validation gesture;
    detecting a second modification of a characteristic of the radio wave, the second modification being resultant from an end of the gesture, the acquisition of a right for the user being dependent on the first modification and the second modification, a lifetime of the right being directly linked to a duration of the validation gesture;
    extracting, from a frame of the radio wave, a random factor time-variable verification code allowing a timestamp to be deduced; and
    sending, to a server that manages the right, a detection message relating to at least one detection, wherein the detection message comprises the random factor time-variable verification code, allowing a timestamp to be deduced.

2. The method of claim 1, the method further comprising extracting, from a frame of the radio wave, an identifier of a device which sent the near-field radio wave, wherein the detection message relates to at least one detection comprising said identifier in addition to the random factor time-variable verification code.

3. The method of claim 2, wherein the detection message comprises a datum relating to the user in addition to the random factor time-variable verification code and in addition to the identifier of the device.

4. The method of claim 2, further comprising sending a plurality of successive detection messages up to the detection of the second modification, a first message of the plurality of successive detection messages being sent as soon as the first modification is detected.

5. The method of claim 2, wherein, before a datum is extracted from a frame, sending a return message indicative of the detection of the validation gesture to the device which sent the near-field radio wave.

6. A computer comprising a processor and a memory, the memory having stored thereon instructions which, when executed by the processor, cause the computer to implement the method of claim 1.

7. A non-transitory, computer-readable storage medium having stored thereon instructions which, when executed by a processor, cause the processor to implement the method of claim 1.

8. The method of claim 1, wherein a duration of the acquired right is dependent upon a duration of the validation gesture.

9. A device configured to receive a near-field radio wave using electromagnetic-wave conduction capacities of the body of a user, the user able to make a validation gesture that modifies characteristics of the radio wave, the radio wave comprising frames the device comprising a detection circuit, a processor, and a memory coupled to the processor, the memory containing instructions that are intended to be executed by the processor in order to:
- detect a first modification of a characteristic of the radio wave, the first modification being resultant from a start of the gesture;
- detect a second modification of a characteristic of the radio wave, the second modification being resultant from an end of the gesture, the acquisition of a right for the user being dependent on the detections of the first and second modifications, a lifetime of the right being directly linked to a duration of the validation gesture;
- extract, from a frame of the radio wave, a random factor time-variable verification code allowing a timestamp to be deduced; and,
- send, to a server that manages the right, a detection message relating to at least one detection, wherein the detection message comprises the random factor time-variable verification code, allowing a timestamp to be deduced.

10. A system for acquiring a temporary right, the system comprising:
the receiving device of claim 9;
a sending device configured to emit a near-field radio wave; and
a rights-managing device configured to attribute a right dependent upon at least one datum relating to the start of the validation gesture and to the end of the validation gesture, a lifetime of the right being directly linked to a duration of the validation gesture.

11. The system of claim 10, wherein:
the sending device is configured to detect a physical contact with the user; and
the rights-managing device is configured to attribute the right dependent upon a datum relating to physical contact.

12. The system of claim 10, wherein:
the sending device is further configured to insert, inter the near-field radio wave, a random factor known the to the rights-managing device; and
the receiving device is further configured to:
extract the random factor, and
transmit the random factor to the rights-managing device.

13. The system of claim 10, wherein the sending device is configured to:
detect a physical contact with the user; and
insert, into the near-field radio wave, a random factor known the to the rights-managing device, the inserting means being activated after detection of the physical contact with the user.

14. The system of claim 9, wherein a duration of the acquired right is dependent upon a duration of the validation gesture.

* * * * *